US007147548B1

(12) United States Patent
Mehrabi

(10) Patent No.: US 7,147,548 B1
(45) Date of Patent: Dec. 12, 2006

(54) GRINDING AND CUTTING HEAD

(76) Inventor: Mohsen Mehrabi, P.O. Box 612, Elberton, GA (US) 30635

(*) Notice: Subject to any disclaimer, the term of this patent is extended or adjusted under 35 U.S.C. 154(b) by 0 days.

(21) Appl. No.: 11/396,765

(22) Filed: Apr. 3, 2006

(51) Int. Cl.
*B24B 7/18* (2006.01)
*B23D 79/02* (2006.01)

(52) U.S. Cl. ........................ 451/323; 451/548; 125/38; 125/39; 83/589; D15/126; 404/112

(58) Field of Classification Search ................ 451/353, 451/359, 548–551; 83/589, 663, 676; D15/126, D15/138–139; 404/112, 113, 118, 129; 125/9, 125/38, 39
See application file for complete search history.

(56) References Cited

U.S. PATENT DOCUMENTS 2,735,244 A 2/1956 Brown
2,980,098 A * 4/1961 Wayland ........................ 125/3
3,026,655 A * 3/1962 Werner ........................ 451/548
3,318,053 A * 5/1967 Miller ........................ 451/548
3,326,480 A 6/1967 Jones
3,745,719 A 7/1973 Oswald
4,597,225 A 7/1986 Toncelli et al.
4,841,623 A 6/1989 Rine
4,918,872 A 4/1990 Sato et al.
5,243,790 A 9/1993 Gagne
5,409,299 A * 4/1995 Holder ...................... 299/41.1
5,468,178 A 11/1995 Kitko et al.
5,567,503 A 10/1996 Sexton et al.
5,683,143 A * 11/1997 Peterson et al. ........... 299/41.1
5,927,264 A 7/1999 Worley
6,021,771 A 2/2000 Swan et al.
D434,052 S 11/2000 Swan et al.
6,196,911 B1 3/2001 Preston et al.
D508,060 S * 8/2005 Olsen et al. ............... D15/126
6,926,583 B1 8/2005 Nussbaumer et al.

FOREIGN PATENT DOCUMENTS

JP 406039734 A 2/1994

* cited by examiner

*Primary Examiner*—Lee D. Wilson
*Assistant Examiner*—Anthony Ojini
(74) *Attorney, Agent, or Firm*—McNair Law Firm, P.A.

(57) ABSTRACT

A grinding and cutting head adapted to be mounted with a rotating disk of a grinding and cutting machine. The head includes a plate having a first surface which mounts at least one carrier. The carrier includes a vertical slot along one side which extends upwardly from the first surface of the plate. A generally rectangular shaped diamond cutting element is secured in the slot with first and second edges thereof exposed outwardly of the carrier. The structure provides that the one of the first and second edges are exposed in the direction of rotation of the disk.

14 Claims, 3 Drawing Sheets

GRINDING AND CUTTING HEAD

BACKGROUND OF THE INVENTION

The instant invention is directed to a grinding and cutting head adapted to be engaged with the rotating disk of a grinding and cutting machine. The grinding and cutting device is primarily used to remove paint and other residue from concrete, ceramic or stone floors. The grinding and cutting device also removes indentations or crevices, closes the pores in the flooring and presents an even rougher surface. The device may be used to simply prepare stone or concrete to have an even roughened surface with closed pores.

Grinding and cutting instruments are known in the industry such as the arrangements disclosed in U.S. Pat. Nos. 4,597,225 and 5,468,178. These arrangements are improved upon by the instant invention.

It is a primary object of the instant invention to provide a grinding and cutting head which is both efficient and durable.

Another object of the invention is a grinding and cutting head which carries, in a secure manner, one or more diamond cutting members.

Another object of the invention is a carrier for securing a diamond cutting member with a carrier plate.

Another object of the invention is a grinding and cutting head which is easily secured with and removed from the rotating disk of a grinding and cutting machine.

Another object of the invention is the provision of a grinding and cutting head having a resilient mounting surface.

SUMMARY OF THE INVENTION

A grinding and cutting head which is adapted to be mounted with a rotating disk of a grinding and cutting machine. The head includes a plate which supports at least one carrier on a first surface. The carrier includes a vertical slot along one side which extends upwardly from the first surface. A generally rectangular shaped diamond cutting element is secured in the slot with first and second edges thereof being exposed outwardly of the carrier.

The arrangement, when secured with the rotating disk, presents a first of the exposed edges in the direction of rotation of the disk.

Each head includes a plurality of carriers with each carrier carrying a diamond cutting element. Also, each disk mounts a plurality of the heads.

The disks are shaped to include at least one radially directed dove tail slot formed in an outer surface adjacent the periphery. The head is adapted to secure in the slot positioning the diamond cutting element in a desired position.

The plate supporting the carrier may include a pair of downwardly directed wings along opposed sides. The wings are adapted to engage in the dove tail slot positioning the surface of the plate supporting the carrier parallel with the outer surface of the rotating disk and creating an air space between the plate and the surface of the rotating disk.

Alternatively, each head may include a base supporting plate which is shaped to engage in the dove tail slot to position the diamond cutting element in a desired position. Each head is wedge-shaped and adapted to be removably secured in the dove tail slots formed in and about the rotating disk.

A grinding and cutting device, includes a rotating disk having a plurality of dove tail slots radiating outwardly mounting a plurality of heads. The heads, which support a plurality of carriers, are shaped to engage in a fixed position within the slots. The plurality of carriers are affixed to an outer surface of each head to extend vertically outwardly of the outer surface of the heads. The carriers each present vertical sides.

There is a vertically extending slot formed in a first side of each of the carriers. A generally elongated diamond cutting element is secured in each slot with a vertical edge and a horizontal edge positioned outwardly of the carrier. This provides that the horizontal and vertical edges of said diamond cutting element are exposed and positioned to engage the surface being ground and cut.

The head comprises a plate secured with a base. The plate supports the carrier and the base engages with the dove tail slot.

The head comprises a plate with turned edges along opposed sides. The plate supports the carriers with the diamond cutting elements between the turned edges. The turned edges engage in the dove tail slot to position the head relative to the rotating disk. There are a plurality of carriers supported by each head with each carrier supporting a diamond cutting element.

The carrier is shaped with vertical side and end walls. The slot is formed in an end wall and extends horizontally to substantially the mid-point of the carrier. The top of the carrier extends downwardly on the side opposite the vertical slot at an acute angle.

DESCRIPTION OF A PREFERRED EMBODIMENT

Referring now in more detail to the drawings, the invention will now be described in more detail.

In industry, it has been found that floors in manufacturing or machine shops which are formed of concrete or other ceramic materials and have been painted, tend to become hard to clean after extended use because of residue build-up and because the paint cracks and peels. Similarly, these same type floors which have not been painted, due to build-up of waste products and dirt, also are hard to clean. Further, in both instances, these floors tend to absorb rather than reflect light which reduces the light in the work place and may create hazardous or unsafe work conditions.

It has been found that by removing the paint and/or dirt and residue by cutting and grinding the surface of the floor, a brighter, more light reflective surface which is free of crevices, valleys and cracks is produced. Also, the grinding and cutting operation closes the pores of the flooring material on its surface. This surface may be sealed with a known clear sealer. The result is a highly reflective and easily maintained surface.

The grinding and cutting head of the invention has as its primary function the grinding and cutting of floors for the purpose of providing a stripped, even but scored surface. The grinding and cutting head may be used for other purposes and with other materials such as finishing surfaces on stone, marble or other ceramic products.

Figure 1:
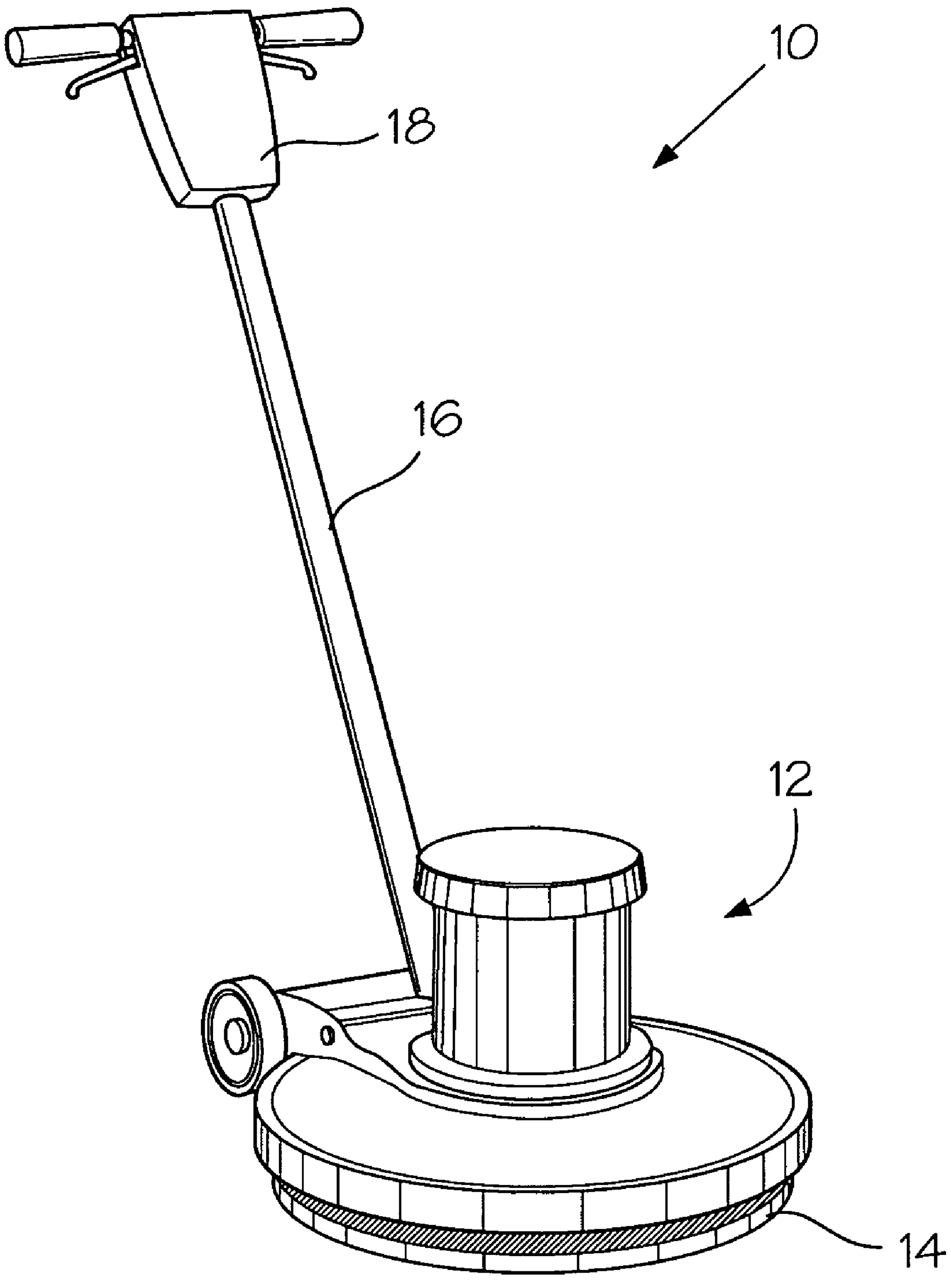
FIG. 1 is a perspective view of a generic grinding and cutting machine with which the grinding and cutting head of the invention may be used.
Figure 2B:
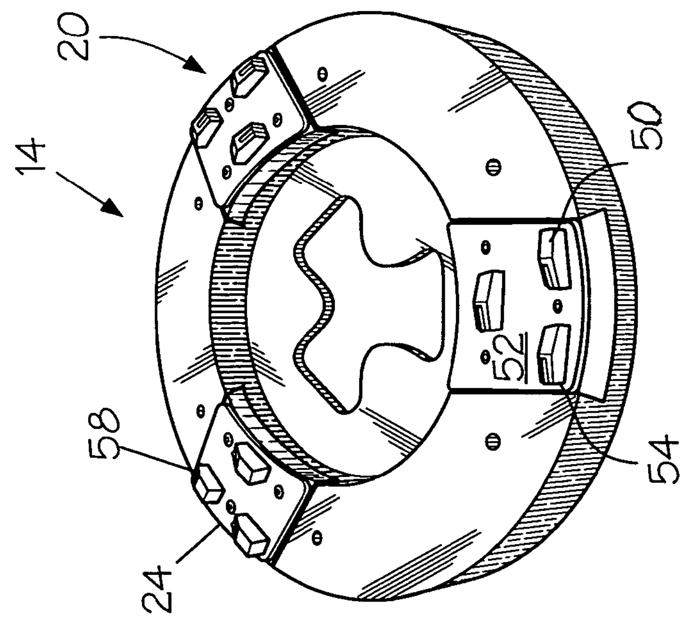
FIG. 2*b* is a perspective view of the assembled grinding and cutting head of FIG. 2*a* mounted with the disk.
Figure 2A:
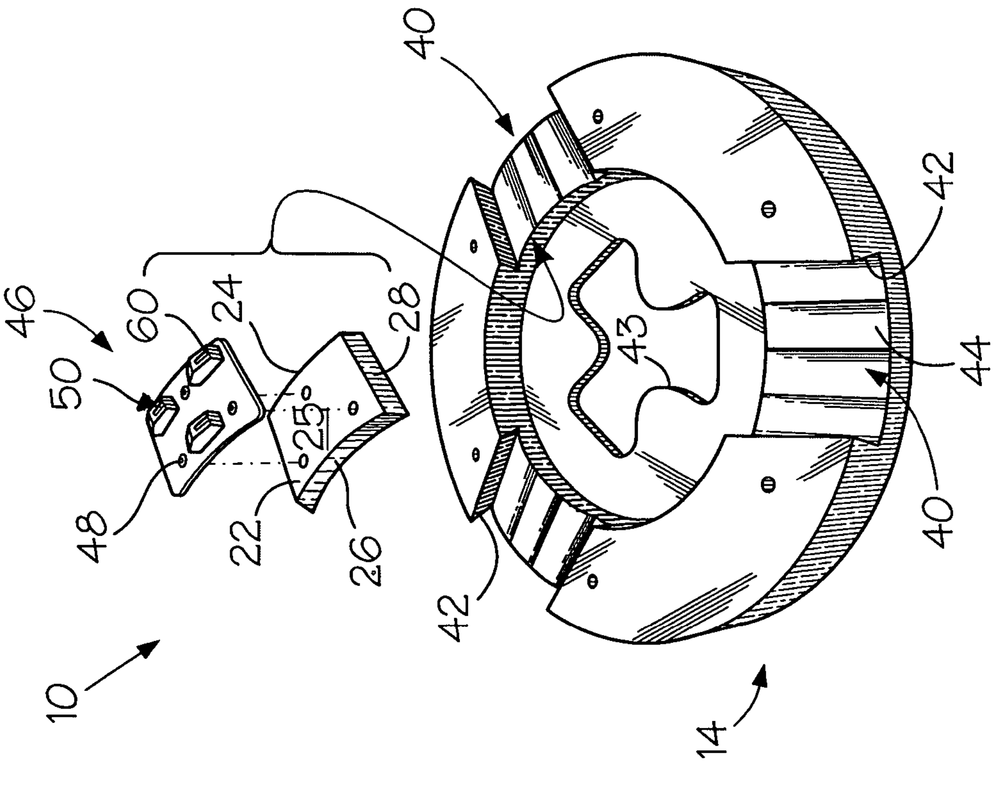
FIG. 2*a* is an exploded perspective view of an arrangement of the grinding and cutting head of the invention associated with a disk of the grinding and cutting machine.

Turning now to FIG. 1, there is shown an illustrative type of grinding and cutting machine 10 with which the grinding and cutting head of the invention may be used. Machine 10 includes a drive section 12 which mounts and rotatably drives a rotating disk 14. Rotating disk 14 is shaped to mount a plurality of cutting heads 20, as shown in FIGS. 2*a* and 2*b*, which act to grind and cut the surface contacted during rotation. A handle 16 which includes actuators 18 is customarily provided to operate machine 10.

It is again noted that the grinding and cutting heads of the invention may operate with many types of grinding and cutting machines and are in no way limited to use with the illustrated device.

Figure 3:
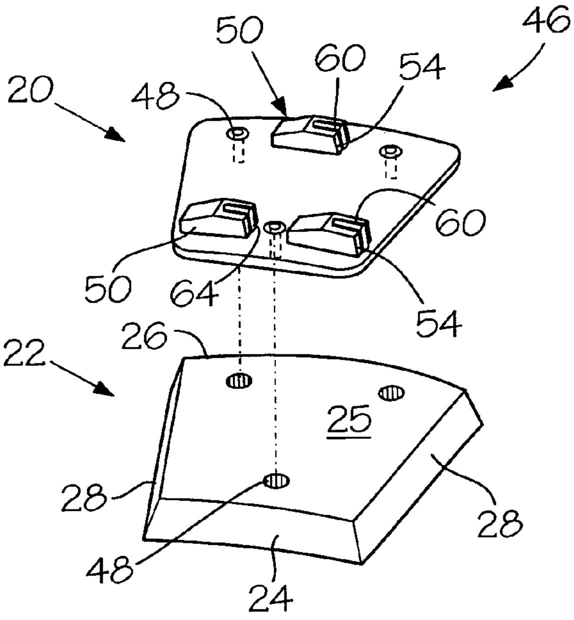
FIG. 3 is a perspective view of the grinding and cutting head shown in FIG. 2*a*.

Turning now to FIGS. 2*a*, 2*b*, and 3, a first arrangement of the rotating disk is shown at 14. The lower or outer surface of disk 14 is shown with three dove tail slots 40 arranged about its periphery. There may be more or fewer slots depending on the intended use and needs of the grinding and cutting machine. Slots 40 are cut to a depth of about ½" with their outer or peripheral edge being smaller than their inner edge. The disk is cut to form side walls 42 which extend slightly outwardly forming base 44 of a greater width than the opening between the outer edges of walls 42. Generally, disk 14 is formed of hardened aluminum.

Base 22 is also generally wedge-shaped and designed to fit or wedge into and be held in position by dove tail slot 40. Base 22 comprises an outer surface 25 and an inner surface (not shown) which extends between outer and inner edges 24, 26. Edge 26 is slightly longer than edge 24 forming the base to be slightly wedge-shaped. Outer surface 25 is of slightly less width than the inner surface causing sides 28 to extend outwardly along a slight angle from the edge of the outer surface to the edge of the inner surface. Base 22 is shaped to fit or wedge into dove tail slot 40 into a fixed radial position positioning its inner and outer edges in alignment with the peripheral surfaces of disk 14. Slot 44 is cut to a depth of about ½". Base 22 is formed of hardened aluminum at a thickness of about ½".

Plate 46, formed of pressed steel or other suitable metal, is shaped to conform with outer surface 25 of base 22. A plurality of aligned apertures 48 are formed in base 22 and plate 46 through which brads or other suitable means are passed to secure plate 46 in fixed position with the outer surface of base 22.

A carrier or a plurality of carriers 50 are secured with the outer surface 52 of plate 46. Each carrier is about ⅝" in length, ½" in width, and ¼" in height. The carriers are constructed to be generally rectangular with vertical sides and ends which merge with generally horizontal upper and lower surfaces. Centrally of the forward end 54 of carrier 50 is formed a vertically extending slot 56 which passes substantially or completely through the carriers. Slot 56 extends rearwardly from edge 54 to about the midpoint of carrier 50. Slightly rearward slot 56, the upper portion of carrier 50 extends slightly downwardly along an acute angle which merges with the vertical rear surface of carrier 50 at substantially its midpoint as shown at 58. It is not essential to so shape the carrier, however, it has been found that carriers so shaped operate slightly more efficiently and are slightly less expensive to produce.

Figure 5:
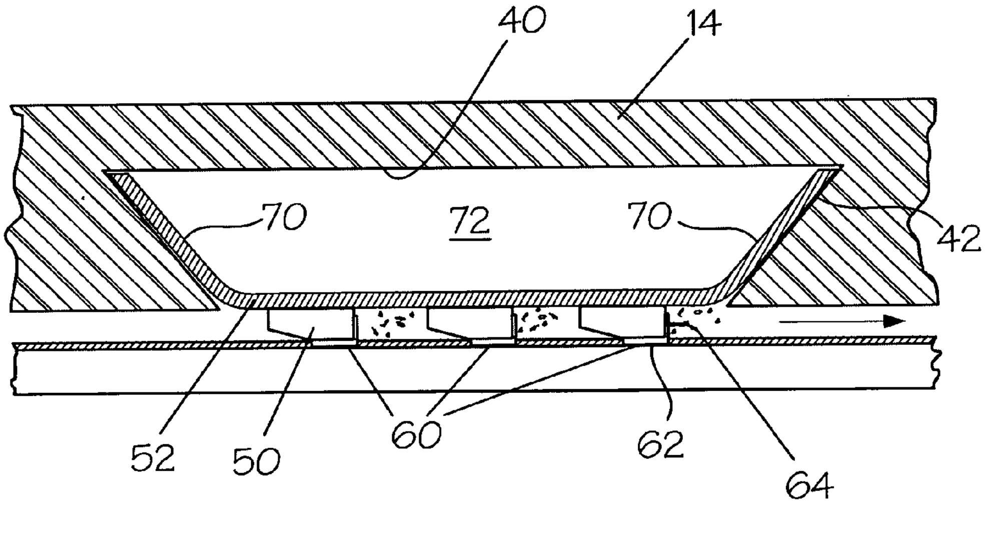
FIG. 5 is a cutaway side view of the arrangement shown in FIG. 4 mounted with a rotating disk.

A generally rectangularly shaped diamond cutter 60 is positioned in slot 56 in position to have its outer edge 62 and forward edge 64 protrude outwardly of carrier 50, as best seen in FIG. 5. A clearance of between 1/16" to ¼" is sufficient.

Diamond cutter 60 is formed of poly-crystal laminate and is sized at ⅜" length, ¼" width and ¼" height. Diamond cutter 60 is fitted into slot 56 and fixed in position by gluing or some suitable cement.

Carriers 50 are positioned on plate 46 preferably in the arrangement shown, i.e. a triangular arrangement with two carriers adjacent the outer or peripheral edge and one inwardly of the outer two. Other arrangements are clearly possible to include from one carrier to as many as nine carriers.

Each carrier 50 is positioned with edge 62 in the direction of rotation so that diamond cutter 60, which extends outwardly of this edge, engages with the surface to be worked first. Further, there may be any number of grinding and cutting heads 20 arranged about disk 14 depending upon the intended use.

In operation, grinding and cutting heads 20 are secured in dove tail slots 40 of rotating disk 14. The grinding and cutting machine 10, carrying rotating disk 14, is positioned over the work surface and activated. As disk 4 rotates, diamond cutting members 60 engage and grind the work surface, removing paint or residue, leveling and providing a roughened surface and filling the pores in the surface.

Figure 4:
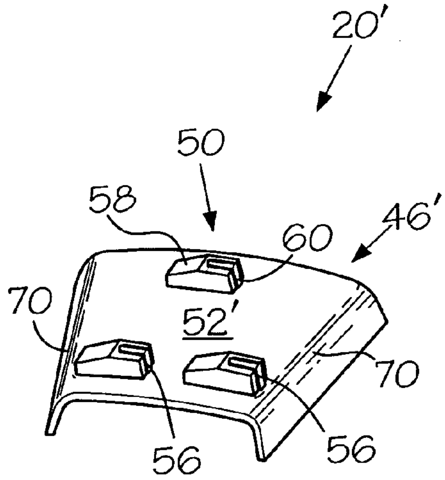
FIG. 4 is a perspective view of another arrangement of the grinding and cutting head of the invention.

A second arrangement is shown in FIGS. 4 and 5. In this arrangement, cutting head $\mathbf{20}^{1}$ is comprised solely of plate $\mathbf{46}^{1}$ which supports carriers 50 carrying diamond cutting elements 60 as earlier described. Plate $\mathbf{46}^{1}$ is shaped to have its outer edges 70 turned upwardly or toward disk 14 along an angle away from outer surface $\mathbf{52}^{1}$. Plate $\mathbf{46}^{1}$, as shown, is formed into a generally wedge-shaped configuration. Edges 70 are of a height generally equal the length of side walls 42 of dove tail slot 40 and are arranged along an angle to generally wedge into the dove tail slots as shown generally in FIGS. 2*b* and 5. This arrangement eliminates base 22. It also provides for an air space between rotating disk 14 and plate $\mathbf{46}^{1}$ which provides for a degree of elasticity in the cutter head mounting, and further provides a cooling vane. The operation, when using cutting head $\mathbf{20}^{1}$, is otherwise as previously described.

While a preferred embodiment of the invention has been described using specific terms, such description is for illustrative purposes only, and it is to be understood that changes and variations may be made without departing from the spirit or scope of the following claims.

What is claimed is:

1. A grinding and cutting head adapted to be mounted with a rotating disk of a grinding and cutting machine;

said head includes a plate;

at least one carrier mounted on a first surface of said plate having a vertical slot along one side extending upwardly from said first surface;

a generally rectangular shaped diamond cutting element secured in said slot with first and second edges exposed outwardly of said carrier, whereby;

said head, when secured with said rotating disk, presents a first of said exposed edges in the direction of rotation of said disk.

2. The grinding and cutting head of claim 1 wherein each said head includes a plurality of carriers each carrying a diamond cutting element.

3. The grinding and cutting head of claim 2 wherein said disk includes at least one dove tail slot and said head is wedge-shaped and adapted to be secured in said dove tail slots.

4. The grinding and cutting head of claim 1 wherein said disk mounts a plurality of said heads.

5. The grinding and cutting head of claim 1 wherein said disk includes at least one dove tail slot formed in an outer surface adjacent its periphery;

said head being adapted to secure in said slot positioning said diamond cutting element in a desired radial position.

6. The grinding and cutting head of claim 5 wherein said plate includes a pair of downwardly directed wings along opposed edges, said wings being adapted to engage in said dove tail slot positioning said first surface of said plate substantially parallel with said outer surface of said rotating disk creating an air space between said plates and said rotating disk.

7. The grinding and cutting head of claim 1 wherein said head includes a base supporting said plate;

said base being adapted to engage in said dove tail slot positioning said head carrying said diamond cutting element in a desired position.

8. The grinding and cutting device of claim 1 wherein there are a plurality of carriers each carrying diamond cutting elements secured with each plate.

9. The grinding and cutting device of claim 1 wherein a portion of an upper surface of said carrier is arranged at an acute angel.

10. The grinding and cutting device of claim 1 wherein said slot extends to substantially a mid-point of said carrier.

11. The grinding and cutting device of claim 1 wherein said diamond cutting elements are poly-crystal laminate.

12. A grinding and cutting device comprising:

a rotating disk having a plurality of dove tail slots radiating outwardly;

a plurality of heads shaped to engage in fixed position within said slots;

a plurality of carriers affixed to an outer surface of said heads, said carriers extending vertically outwardly of said outer surface presenting vertical sides;

a vertically extending slot formed in a first side of said sides;

a generally elongated diamond cutting element secured in said slot with a vertical edge and a horizontal edge being positioned outwardly of said carrier whereby;

said horizontal and vertical edges of said diamond cutting element are positioned to be unobstructed when engaging a surface being ground and cut.

13. The grinding and cutting device of claim 12 wherein said head comprises a plate secured with a base, said plate supporting said carriers and said base engaging in said dove tail slot.

14. The grinding and cutting device of claim 12 wherein said head comprises a plate with an outer surface having turned edges along opposed sides, said outer surface of said plate supporting said carriers between said turned edges, and;

said turned edges engage in said dove tail slot positioning said head relative to said rotating disk.

* * * * *